(12) United States Patent
Grover et al.

(10) Patent No.: US 8,332,694 B2
(45) Date of Patent: Dec. 11, 2012

(54) METHOD FOR NOTIFICATION OF AN ERROR IN DATA EXCHANGED BETWEEN A CLIENT AND A SERVER

(75) Inventors: Rajeev Grover, Rocklin, CA (US); Weiyun Sun, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1684 days.

(21) Appl. No.: 10/254,556

(22) Filed: Sep. 24, 2002

(65) Prior Publication Data

US 2004/0059964 A1    Mar. 25, 2004

(51) Int. Cl.
*G06F 11/00* (2006.01)

(52) U.S. Cl. .......................................... 714/48

(58) Field of Classification Search ............. 714/47, 714/48; 709/200, 203, 240
See application file for complete search history.

(56) References Cited

U.S. PATENT DOCUMENTS

| | | | | |
|---|---|---|---|---|
| 5,410,536 A | * | 4/1995 | Shah et al. | 370/216 |
| 5,754,752 A | * | 5/1998 | Sheh et al. | 714/4 |
| 5,881,239 A | * | 3/1999 | Desgrousilliers | 709/226 |
| 6,035,418 A | * | 3/2000 | Recio et al. | 714/18 |
| 6,134,680 A | * | 10/2000 | Yeomans | 714/57 |
| 6,550,024 B1 | * | 4/2003 | Pagurek et al. | 714/47 |
| 6,557,122 B1 | * | 4/2003 | Sugauchi et al. | 714/57 |
| 7,263,597 B2 | * | 8/2007 | Everdell et al. | 712/11 |
| 2003/0105990 A1 | * | 6/2003 | Kawai et al. | 714/25 |

OTHER PUBLICATIONS

Davidson et al. "The arpanet telnet protocol: its purpose, principles, implementation, and impact on host operating system design." Proceedings of the fifth symposium on data communications. 1977.*
"The TCP/IP Guide—Telnet interrupt handling using out-of-band signaling: the telnet synch function." acquired from "http://www.tcpipguide.com/free/t_TelnetInterruptHandlingUsingOutOfBandSignalingTheT.htm" on Jan. 30, 2007.*
Postel et al. "RFC 854—Telnet protocol specification." Network working group. May 1983.*
McKenzie et al. "RFC 529—Note on protocol synch sequences." Network working group. Jun. 29, 1973.*

* cited by examiner

*Primary Examiner* — Philip Guyton (57) ABSTRACT

A method for notification of an error in data exchanged for an application between a client computer telnet and a server computer telnet is disclosed. The error is detected. A message corresponding to the error is generated such that the error message is separate from the data. The error message is handled such that it has priority over the data.

18 Claims, 7 Drawing Sheets

(Prior Art)

METHOD FOR NOTIFICATION OF AN ERROR IN DATA EXCHANGED BETWEEN A CLIENT AND A SERVER

FIELD OF THE INVENTION

Embodiments of the present invention relate to the field of network computing in a client-server environment. Specifically, embodiments of the present invention relate to a method for notification of occurrence of application errors between a server computer and a client computer.

BACKGROUND OF THE INVENTION

Modern network computing allows great benefits by sharing information and computing resources. As an example, information is transmitted within networks between server computers and client computers in response to requests by the client computer's application.

Telnet provides an ability for client users to access host-based applications from the server. Interconnectivity is effectuated by telnet, even between different operating systems. At the application layer, telnet functions as a protocol to supply service use functions for remote operations. Telnet also functions at the session layer, providing dialog control, session administration, handling connection establishment, file transfer, and connection release. Further, telnet handles the presentation layer concern of translation.

Occasionally, errors occur in the execution of application instructions. Such errors can interfere with the performance of the application. Further, such errors can interfere with the sequential transfer of data between the server and the client. This is because, with some errors, from the point in time at which the error occurs until the error is corrected, further data sent by the server to the client will not be handled properly.

The data is not handled properly because it will be handled out of sequence, may lead to further errors and delays, with data backed up in queue, and/or data may be lost. Lost data may have to be retransmitted, which is time-consuming and wasteful of network resources. To prevent such improper handling, delays, and associated problems, it is desirable that servers be timely notified of the occurrence of application errors on the client.

Initially, error messages are handled like any other message; e.g., application errors are exchanged as normal Telnet messages. Upon discerning that a particular such message constitutes an error message, action may be taken thereon. However, no conventional mechanism exists to distinguish between error messages and regular data. Telnet thus conventionally views error messages in the same queue as other data.

Figure 1A:
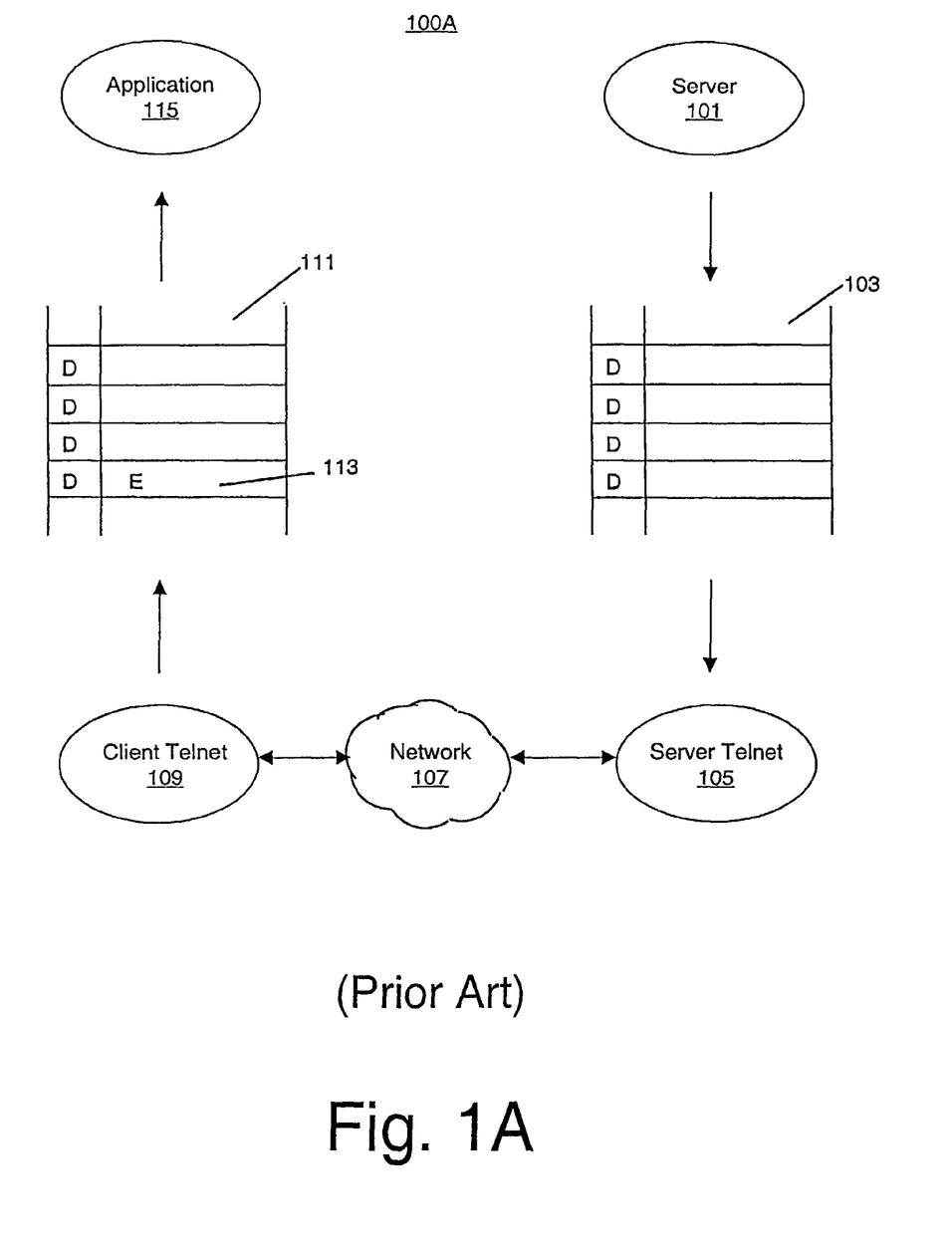
FIG. 1A depicts conventional data flow between a client and a server in which an error appears among the received data stacked at the client.

With reference to Prior Art FIG. 1A conventional data flow 100A is depicted between a client and a server in which an error appears among the received data stacked at the client. Data queued by server 101 in a queue 103 is transmitted via telnet 105 from server 101 through a network 107 to telnet 109 for a client 111. Client application 115 requires the data from queue 111. An error 113 appears within the queue 111.

Figure 1B:
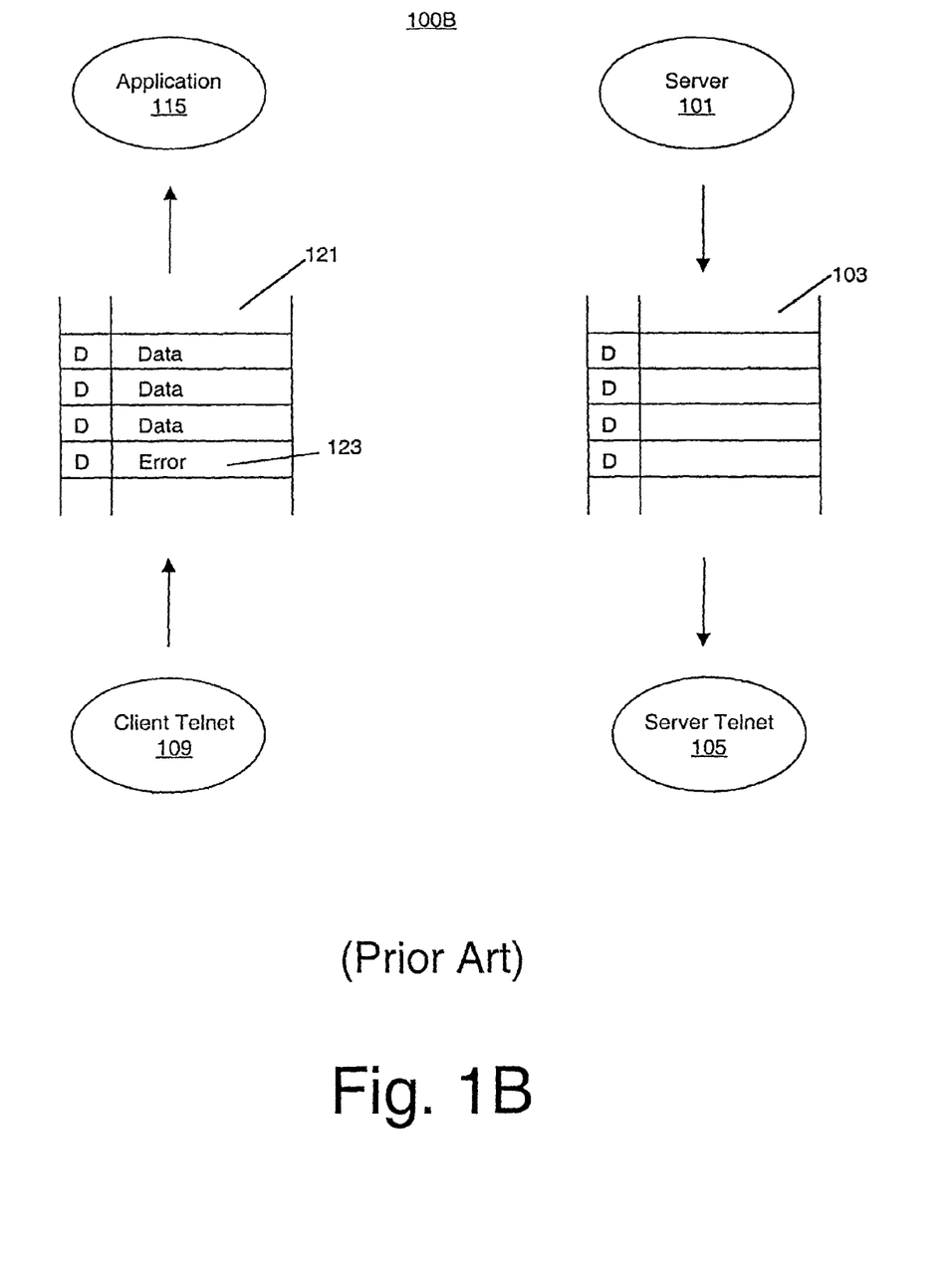
FIG. 1B depicts conventional stacking of an error message among normal data for routine handling.

Referring to Prior Art FIG. 1B, a stack 121 of messages for use by application 115 contains usable data, as well as error message 123, by which application 115 is notified of the error 113 (Prior Art FIG. 1A). However, message stack 121 must be read completely, each message handled sequentially as it appears in stack 121, until error message 123 is reached.

Thus, application 115 must read all the data in stack 121 to discover and read error message 123, by which error 113 is discovered and appropriate action may be taken. This is inefficient and time-consuming. Moreover, server 101 may, since transmitting the data in queue 103, be compiling another corpus of data for transmission to client telnet 109 to continue a data flow 100B. This new data being queued in queue 103 may require processing of the data in queue 111 prior to its being sent to client 109.

Error 113 however forestalls complete processing of the data in queue 111 (Prior Art FIG. 1A). Thus, one of two possible deleterious effects can occur. Either the new data in queue 103 will be delayed at the server, or it will be sent before the data in queue 111 is fully processed, in which case it will be useless, and dropped. In fact, the previous data load must be re-sent without error beforehand. Thus, data will be lost, time will be wasted, and server and network resources will be taxed to correct the original error, as well as to ameliorate the compounded effects of re-sending replacement data for what is lost.

Applications thus have to parse each message, separate out any error messages, and then handle the error messages appropriately before taking appropriate ameliorative action. The application has to look at each and every message for error messages. However, this is time-consuming and resource-intensive. Also, it may not in some instances operate rapidly enough to prevent data backups, delays, and/or lost data.

SUMMARY OF THE INVENTION

A method for notification of an error in data exchanged for an application between a client computer telnet and a server computer telnet is disclosed. The error is detected. A message corresponding to the error is generated such that the error message is separate from the data. The error message is handled such that it has priority over the data.

BRIEF DESCRIPTION OF THE DRAWINGS

Prior Art

Prior Art

DETAILED DESCRIPTION OF THE INVENTION

A method and system for notification of occurrence of application errors between a server computer and a client computer is disclosed.

Notation and Nomenclature

Figure 2:
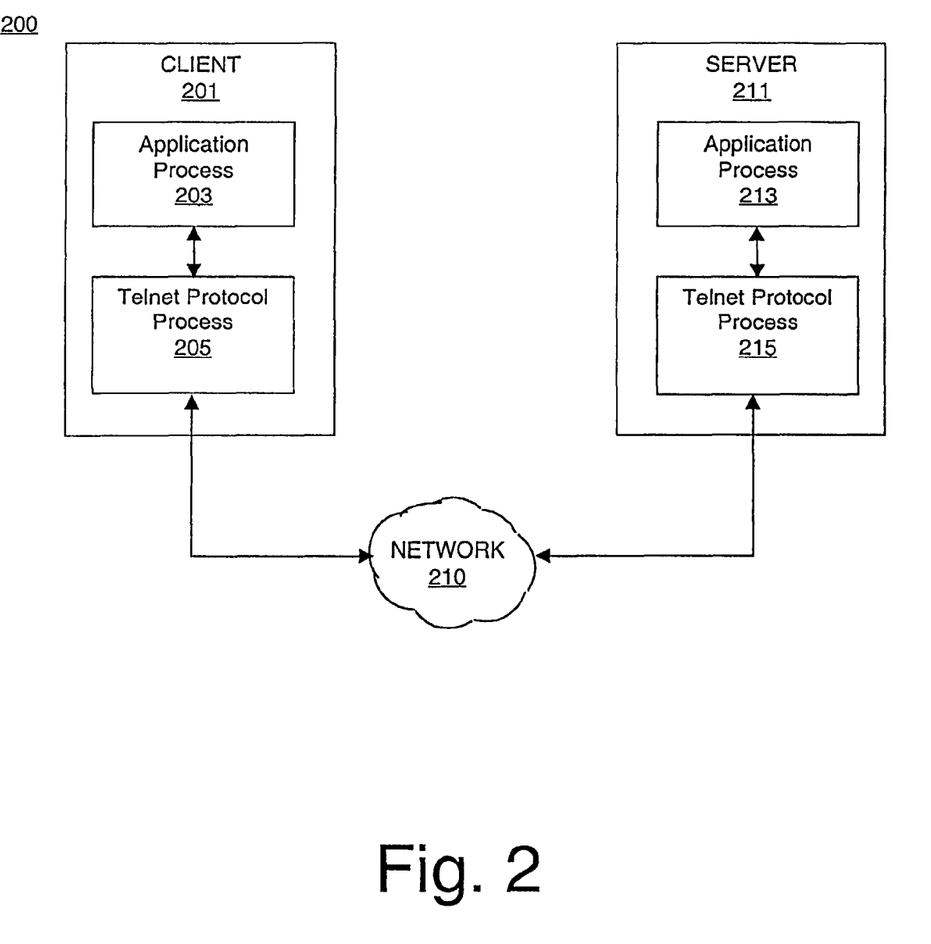
FIG. 2 depicts a modular view of application and telnet processes deployed between client and server, according to one embodiment of the present invention.

One embodiment of the present invention is deployed within a network environment (e.g., network environment 200; FIG. 2) comprising a server, a network, and a client computer (e.g., server 211, network 210, client computer 201;

FIG. 2). The network of this environment can be any kind of network, such as a local area network (LAN), wide area network (WAN), or the Internet.

A computer system that embodies the system for notification of varying versions of code between a server computer and a client computer can be any kind of computer system. For example, the computer system can be a workstation computer system, a personal computer system, a main-frame computer system, or a supercomputer system. In one embodiment, the computer system is a client computer system (e.g., client computer 201; FIG. 2). Modules of the system for notification of varying versions of code between a server computer and a client computer can be deployed in software, firmware, and/or hardware or any combination of software, firmware, and/or hardware.

Figure 5:
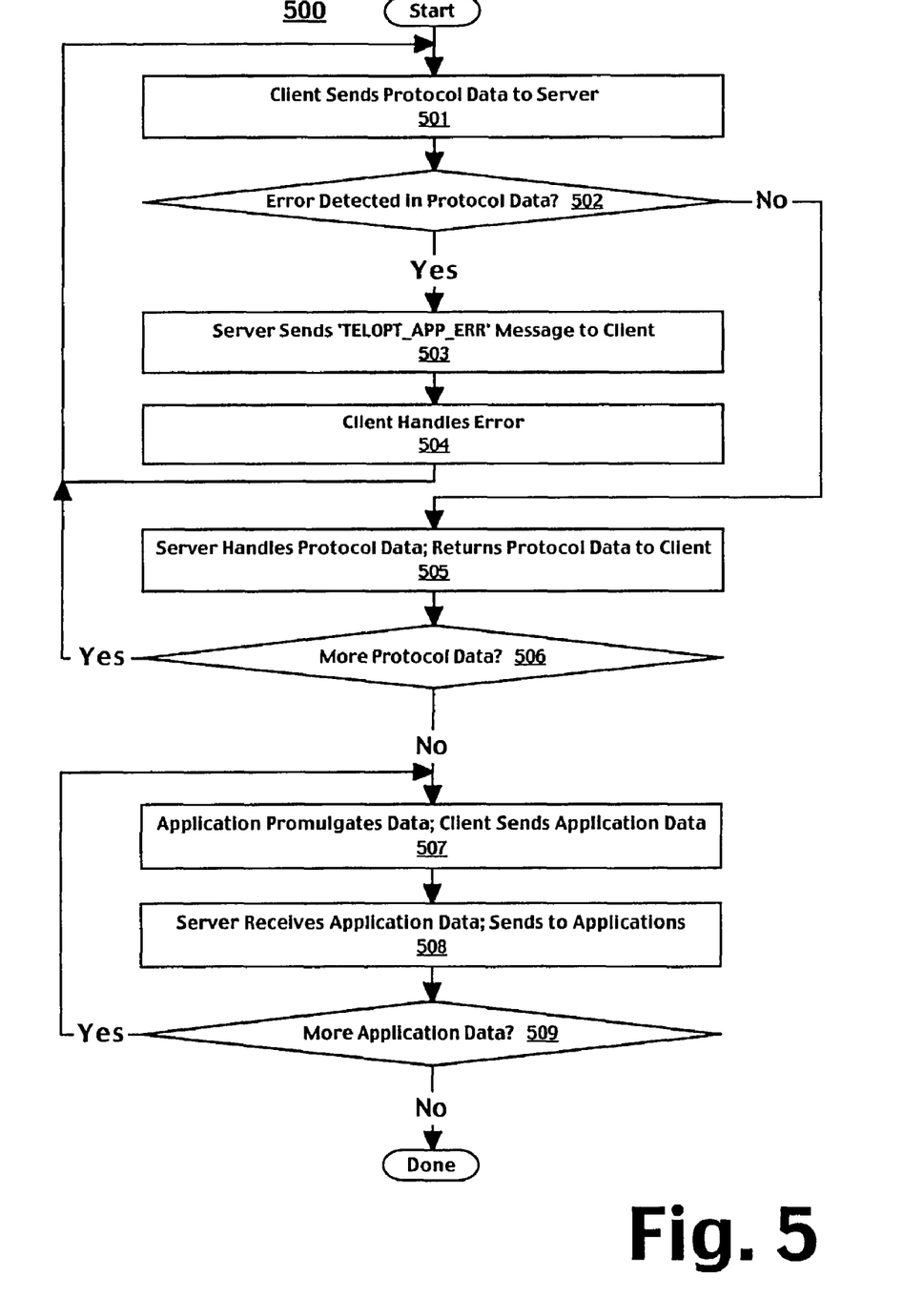
FIG. 5 is a flowchart of the steps in a process for handling error messages according to one embodiment of the present invention.

Portions of the detailed descriptions of embodiments of the invention that follow are presented in terms of processes (e.g., Processes 500, 600; FIG. 5, 6, respectively). Although specific steps are disclosed in figures herein describing the operations of these processes, such steps are exemplary. That is, embodiments of the present invention are well suited to performing various other steps or variations of the steps recited in the flowcharts herein.

In one embodiment, such processes are carried out by processors and electrical/electronic components under the control of computer readable and computer executable instructions. The computer readable and computer executable instructions reside, for example, in data storage features, memory, registers and other components of a computer system such as a client computer (e.g., client computer 201; FIG. 2). However, the computer readable and computer executable instructions may reside in any type of computer readable medium.

An embodiment of the present invention effectuates the detection of errors in data transferred between client computers and servers, and a message corresponding to the error is generated such that the error message is separate from the data and is handled such that it has priority over the data. In one embodiment, the error message is generated by the telnet process of the receiving computer. In one embodiment, the error message is handled by an application error handler and given priority over the data. Client computer and server applications exchange errors as special telnet messages, thus providing an out of band channel for error messages. This arrangement effectuates expedited handling of error messages.

This increases efficiency, saves time, and allows the content of error messages to be ascertained such that errors can be expeditiously detected and corrected and corrective action taken, prior to backing up data waiting to be transferred. This has the advantage of economizing server and network resources. Less data will be lost, less time will be wasted, and server and network resources will be not be heavily taxed, since compounded effects of re-sending replacement data for what is lost is minimized and amelioration for such lost data is largely obviated.

Applications thus do not have to parse each message to separate out error messages, and can handle the error messages appropriately and expeditiously to take appropriate ameliorative action. The application does not have to look at each and every message for error messages. This saves time and economizes use of computing resources. This arrangement operates rapidly enough to minimize data backups, delays, or lost data.

Exemplary System and Method

Embodiments of the present invention are discussed primarily in the context of a method and system for notification of occurrence of application errors between a server computer and a client computer. With reference to FIG. 2, a network environment 200 upon which an embodiment of the present invention can be deployed is described.

Network environment 200 comprises a client-server system wherein a server computer 211 is coupled through a network 210 to a client computer 201. Network 210 can be a LAN, WAN, the Internet, or any other kind of network. Server computer 211 stores application process information 213, which is downloaded via a server telnet protocol process 215, through network 210 to client computer 201 for various uses thereon. Data transferred by server 211 via network 210 is received in client computer 201 by a telnet protocol process 205. Client computer 201 can run various applications. One such application is application process 203.

Figure 3:
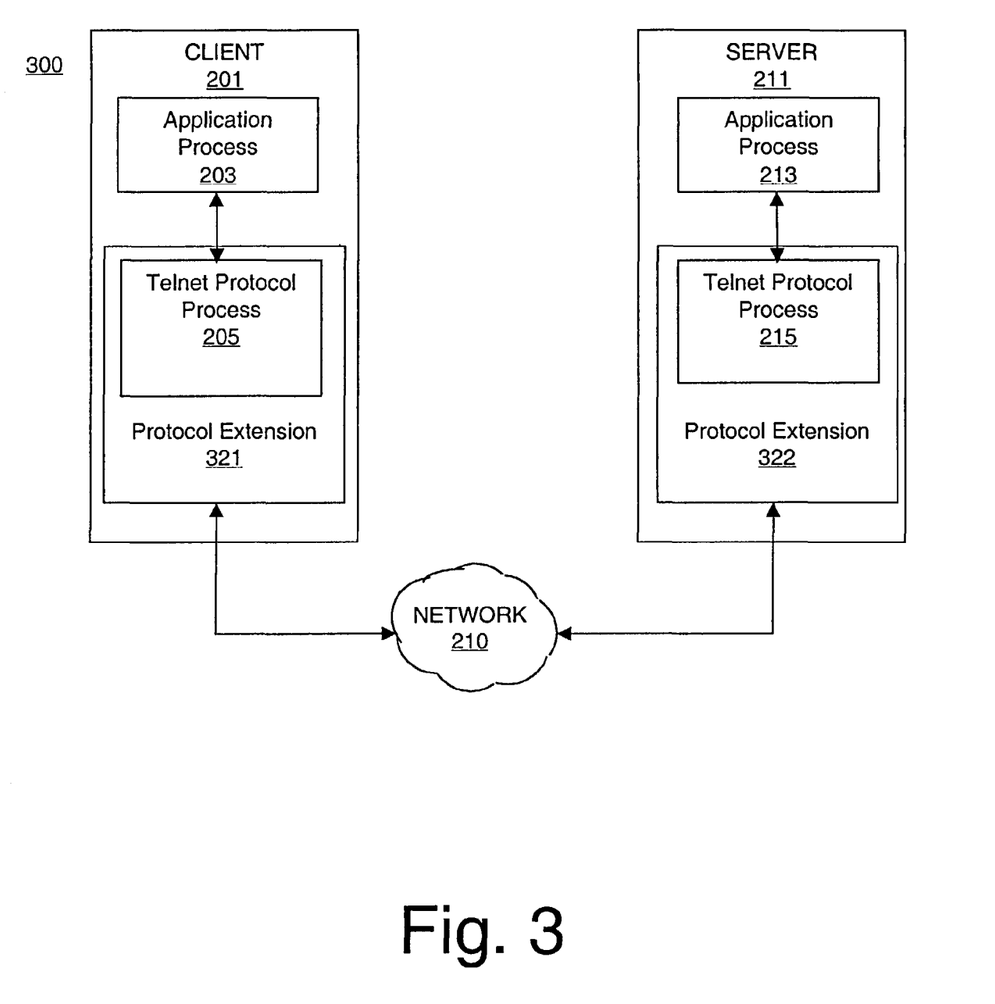
FIG. 3 depicts a modular view of application and telnet processes with extensions deployed between client and server, according to one embodiment of the present invention.

FIG. 3 depicts a network environment 300. Network environment 300 comprises a client-server system wherein as server computer 211 is coupled through a network 210 to a client computer 201. Server computer 211 stores application process information 213, which is downloaded via a server telnet protocol process 215 directly, or via a protocol extension 322. The application process information 213 then proceeds through network 210 to client computer 201 for various uses thereon. Data is transferred from server 211 to client 201 via network 210. The data is received in client computer 201 by its telnet protocol process 205. The data is made available to application process 203, therein via a protocol extension 321, or directly via telnet protocol process 205. Protocol extensions 321 and 322 include various telnet commands and options created by an application developer.

Figure 4:
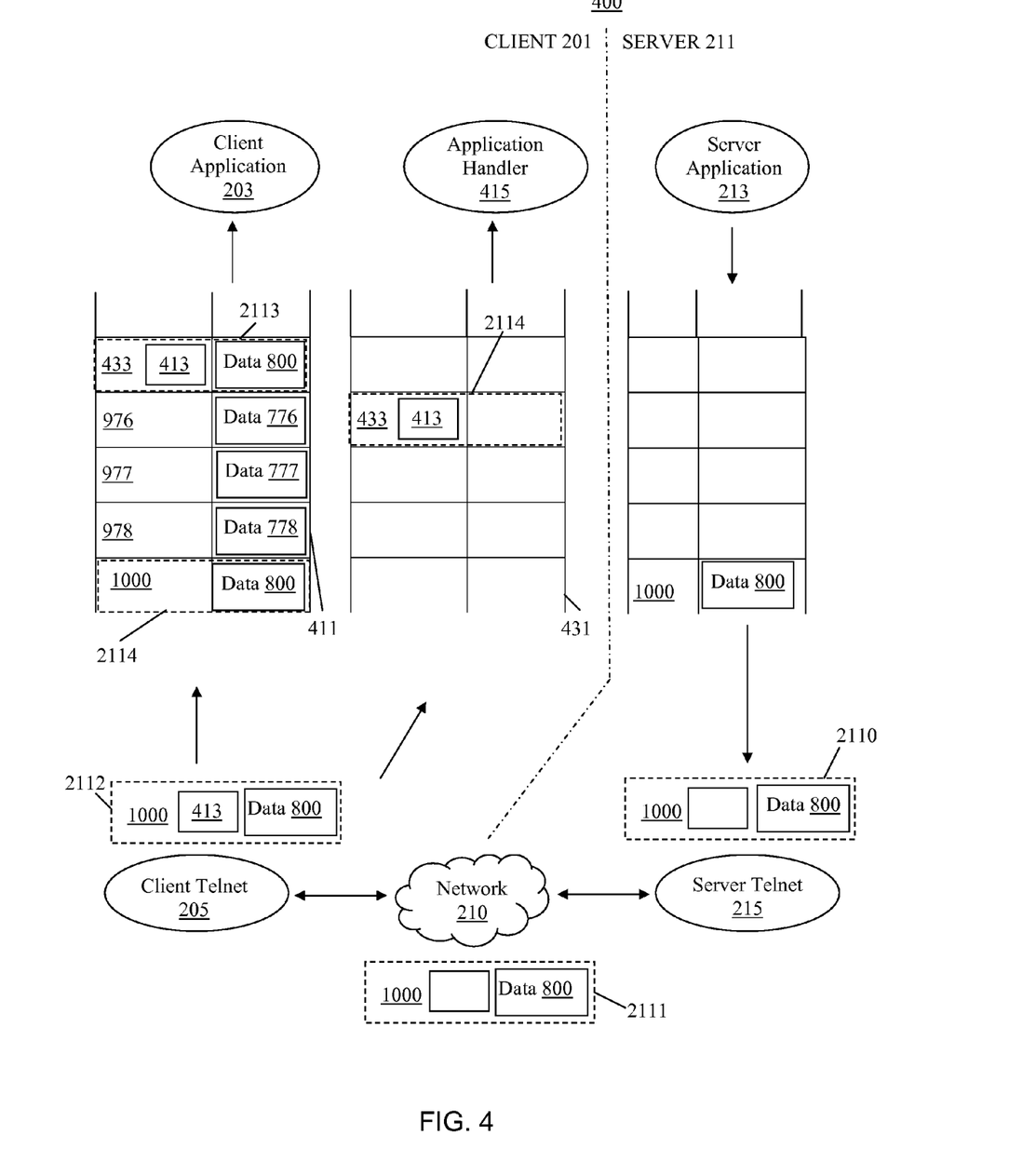
FIG. 4 depicts telnet handling of error messages with stacking separate from routine data, according to one embodiment of the present invention.

FIG. 4 depicts exemplary data flow in a network environment 400. In an embodiment of the present invention, data 800 queued by server 211 in a queue 1000, indicated as flow point 2110, is transmitted via telnet 215 from server 211 through a network 210, indicated as flow point 2111, to telnet 205 on the client side. An error 413 appears in queue 1000, which can signal that an error has been detected in protocol data sent by the server, indicated by flow point 2112.

Upon transmission to the client side, telnet 205 generates two message stacks, a data message stack 411 and an error message stack 431, in an embodiment of the present invention. Data message stack 411 contains usable data for client application 203, e.g., data 776, 778 and 779. Error message stack 431 contains error message 433. Error messages such as error message 433 are handled in one embodiment by an application handler 415, (indicated by flow point 2114) rather than by the client application 203, as it also handles the data messages in message stack 411. In another embodiment, error messages are stacked in the same queue (e.g., queue 411) with data messages, but are given priority (indicated by flow point 2113). These arrangements effectuate expedited handling of error messages such as error message 433.

Upon handling an error message 433, client application 203 ceases sending requests for new data to server 211 until the error is resolved by application handler 415 or, in another embodiment, by client application 203. Advantageously, this increases efficiency, saves time, and allows the content of error messages to be ascertained such that errors can be expeditiously detected and corrected and corrective action taken, prior to backing up queue 1000 in client 201. This has the further advantage of economizing server and network resources will not be heavily taxed, since compound effects of re-sending replacement data for what is lost is minimized and amelioration for such lost data is largely obviated.

Applications thus do not have to parse each message to separate out error messages, and can handle the error messages appropriately and expeditiously to take appropriate ameliorative action. The application does not have to look at each and every message for error messages. This saves time and economizes use of computing resources. This arrangement operates rapidly enough to minimize data backups, delays, or lost data.

FIG. 5 is a flowchart of a process 500 for handling error messages according to an embodiment of the present invention. Process 500 is discussed from the perspective of an error in the protocol data being detected by the server (e.g., server 211; FIG. 2). However, Process 500 is exemplary; it is appreciated that in one embodiment, errors may be detected in protocol data by a client computer (e.g., client 201; FIG. 2) as well.

In one embodiment, Process 500 is executed by processors and electrical/electronic components under the control of computer readable and computer executable instructions. The computer readable and computer executable instructions reside, in one embodiment, in data storage features, memory, registers and/or other components of a computer system such as a client computer (e.g., client computer 201; FIG. 2), or in any type of computer readable medium.

Process 500 begins with step 501, wherein a client computer sends protocol data to a server.

In step 502, it is determined whether an error is detected in protocol data. In step 503, where an error is detected in the protocol data, the server sends an error message, for instance a message such as 'TELOPT_APP_ERR' or a substantively similar error message, to the client. The error message can be generated by the protocol extensions (e.g., protocol extension 322 and 321, respectively; FIG. 3). In one embodiment, the error message can be generated by the telnet process operational at the server or at the client computer (e.g., telnet 215 and 205, respectively; FIG. 2, 3).

The error message in one embodiment is handled separately from other data messages, e.g., error message 433 containing error 413 of queue 1000 in error message stack 431, shown as flow point 2214 of FIG. 4, thus according the error message with significant priority over normal message traffic. In an alternative embodiment, the error message 433 can be handled in the same stack, but with a higher priority assigned, such that it is accorded head of the line privileges or otherwise handled expeditiously, relative to the handling of other data messages, e.g., error message 433 containing error 413 of queue 1000 including data 800 in data stack 411, shown as flow point 2213 of FIG. 4. In either embodiment, the error message is advantageously handled.

In step 504, the client computer handles the error accordingly. In one embodiment, the error may be handled in response to the corresponding error message by an application handler (e.g., error message 433, application handler 415; FIG. 4). In step 505, upon handling the error, or if no error is detected in step 502, the server handles the protocol data and returns protocol data to the client.

In step 506, it is determined whether more protocol data must be processed. If more protocol data is to be processed, Process 500 loops back to step 501 and repeats. If there is no more protocol data to be processed, Process 500 proceeds to step 507.

In step 507, an application process (e.g., application 203; FIG. 2, 3, 4) generates data and the client computer sends this application data to the server. In step 508, the server receives the application data from the client computer and sends it to its own corresponding application processes.

In step 509, it is determined whether more application data must be processed. If more application data must be processed, Process 500 loops back to step 507 and repeats. If no further application data is to be processed, Process 500 is complete.

Figure 6:
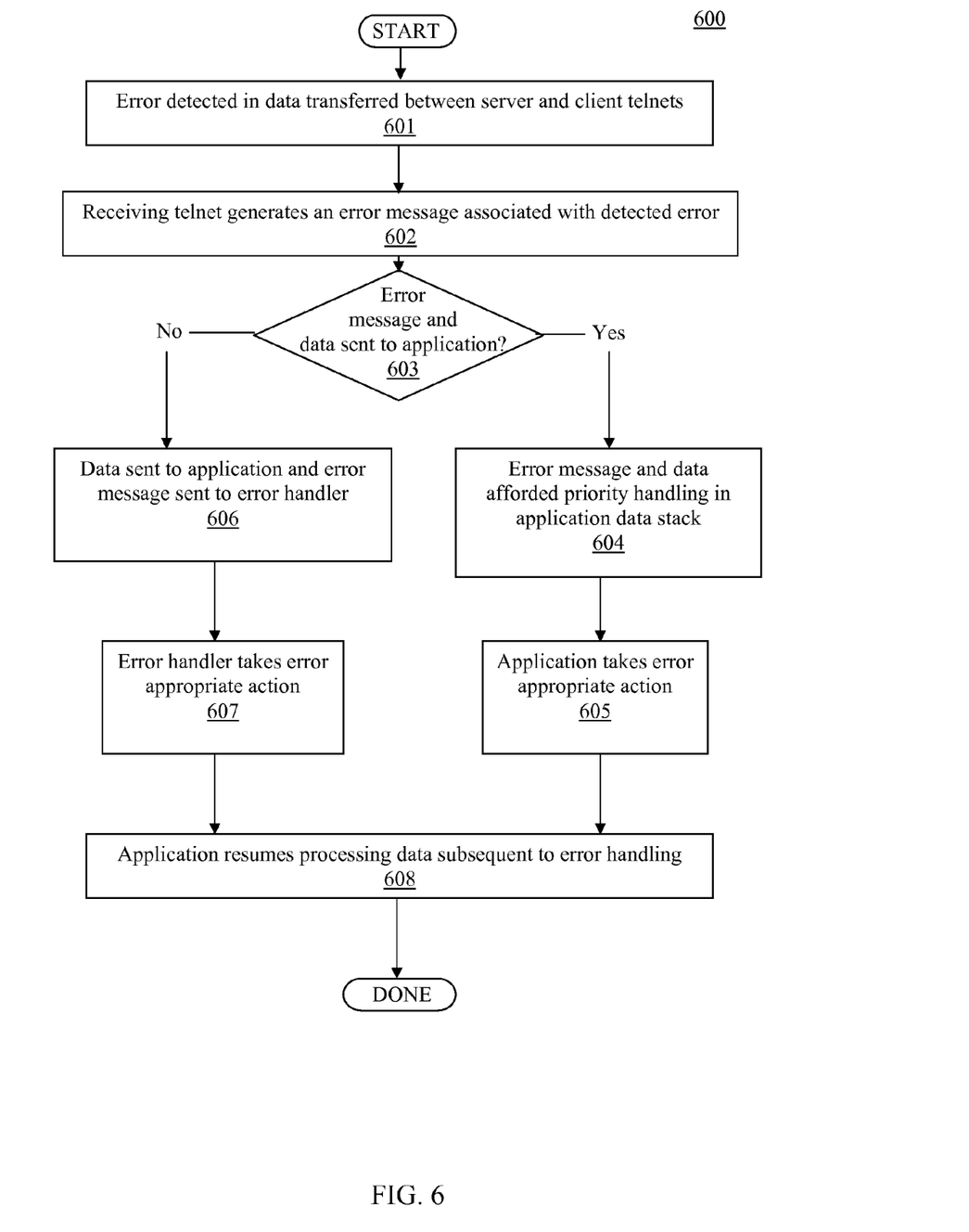
FIG. 6 is a flowchart of the steps in a process for handling error messages according to an embodiment of the present invention.

FIG. 6 is a flowchart of a process 600 for handling error messages according to an embodiment of the present invention. In one embodiment, Process 600 is executed by processors and electrical/electronic components under the control of computer readable and computer executable instructions. The computer readable and computer executable instructions reside, in one embodiment, in data storage features, memory, registers and/or other components of a computer system such as a client computer (e.g., client computer 201; FIG. 2), or in any type of computer readable medium.

Process 600 begins with step 601, wherein an error (e.g., error 413; FIG. 4) is detected in a data queue (e.g., data queue 1000; FIG. 4) that is transferred between the telnet processes of a client computer and a server (e.g., telnets 205 and 215, respectively; FIG. 4), shown as flow point 2112 of FIG. 4, in an embodiment of the present invention.

In step 602, the receiving telnet, e.g., telnet 205 of FIG. 4, generates an error message (e.g., error message 433; FIG. 4) corresponding to the error 413 in the transferred data queue 1000 containing data 800, which is separate from the data itself, in an embodiment of the present invention.

In step 603 of process 600, if the error message 433 and data 800 are to be handled by the client application 203, process 600 continues to step 604, in an embodiment of the present invention. In an alternative embodiment, if error message 433 and data 800 are not handled by client application 203, process 600 continues to step 606.

In step 604, the error messages are handled with priority of over the data. In an embodiment of the present invention, error message 433 containing error 413 of queue 1000 containing data 800 is afforded priority handling, such that error message 433 is placed in the front of the data stack, shown as flow point 2213 atop data stack 411 of client application 203 of FIG. 4.

In step 605, the application takes corresponding appropriate ameliorative action, upon which Process 600 is complete. The ameliorative action taken can vary dependent upon the nature of the error and is appropriate to be responsive to that particular error, such that correction of the error can follow from the action.

In step 606 of process 600, a dedicated application handler (e.g., application error handler 415; FIG. 4) handles error message 433, in an embodiment of the present invention. In the present embodiment, error message 433 containing error 413 is sent to error handler 415 while data 800 of queue 1000 is sent to data stack 411, shown as flow points 2114 of FIG. 4. Flow point 2114 shows that data 800 has been placed at the end of line of data stack 411, e.g., last in last out. Flow point 2114 further shows that error message 433 containing error 413 is placed in error message stack 431.

In step 607 of process 600, error handling application 415 takes corresponding appropriate ameliorative action, upon which process 600 is complete. The ameliorative action taken can vary, dependent upon the nature of the error and is appropriate to be responsive to that particular error, such that correction of the error can follow from the action.

In step 608 of process 600, subsequent to the resolution of error message 433 by either client application 203 or application handler 415, client application 203 resumes processing data from its data stack, e.g., data stack 411 of FIG. 4.

Such action can include, but is not limited to, notifying a user, causing a pause in further data transfers between client and server while the error is resolved, ascertaining the fault underlying the error, resolving that fault, ascertaining where the exchange of data was paused, ascertaining whether further data is needed to complete a particular processing task of the application, specifying that further data needed to complete the processing task, requesting transfer of that further data corresponding to that specification, and monitoring further data transfers for subsequent errors upon resumption of data transfer between the client and server.

In summary, an embodiment of the present invention effectuates the detection of errors in data transferred between client computers and servers, and a message corresponding to the error is generated such that the error message is separate from the data and is handled such that it has priority over the data. In one embodiment, the error message is generated by the telnet process of the receiving computer. In one embodiment, the error message is handled by an application error handler and given priority over the data. Client computer and server applications exchange errors as special telnet messages, thus providing an out of band channel for error messages. This arrangement effectuates expedited handling of error messages.

An embodiment of the present invention, a method for notification of application errors between a client computer and a server, is thus described. While the present invention has been described in particular embodiments, the present invention should not be construed as limited by such embodiments, but rather construed according to the following claims and their equivalents.

What is claimed is:

1. A method for notification of an error in data exchanged for an application between a client computer telnet and a server computer telnet, comprising:
    detecting said error;
    generating an error message corresponding to said error wherein said error message is separate from said data; and
    handling said error message wherein said error message has priority over said data and wherein said handling is performed with said error message in the same queue as said data, wherein said error message is moved to a front of said queue when said error message is received such that each message in said queue does not have to be reviewed for error messages and each message in said queue, including messages received prior to said received error message, are not discarded before said error message is accessed.

2. The method as recited in claim 1 further comprising taking an action appropriate to said message.

3. The message as recited in claim 2 wherein said action is ameliorative of said error.

4. The method as recited in claim 3 wherein said action is selected from the list consisting essentially of:
    notifying a user;
    causing a pause in further data transfers between said client computer and said server while said error is resolved;
    ascertaining a fault underlying said error;
    resolving said fault;
    ascertaining where said data exchange was paused;
    ascertaining whether further data is needed to complete a particular processing task of said application;
    specifying said further data;
    requesting transfer of said further data corresponding to said specifying; and
    monitoring a further data transfer for a subsequent error, wherein said monitoring is performed upon resumption of said data exchange between said client and said server.

5. The method as recited in claim 1 wherein said detecting is performed by one of said telnets.

6. The method as recited in claim 1 wherein said generating is performed by one of said telnets.

7. In a network environment having a client computer and a server, a system for notification of an error in data exchanged between said client computer and said server, comprising:
    a means for detecting said error and for generating an error message corresponding to said error and wherein said error message is separate from said data; and
    a means for handling said error message wherein said error message has priority over said data and wherein said handling is performed with said error message in the same queue as said data, wherein said error message is moved to a front of said queue when said error message is received such that each message in said queue does not have to be reviewed for error messages and each message in said queue, including messages received prior to said received error message, are not discarded before said error message is accessed.

8. The system as recited in claim 7 wherein said means for handling said error message further takes an action appropriate to said message.

9. The system as recited in claim 8 wherein said action is ameliorative of said error.

10. The system as recited in claim 9 wherein said action is selected from the list consisting essentially of:
    notifying a user;
    causing a pause in further data transfers between said client computer and said server while said error is resolved;
    ascertaining a fault underlying said error;
    resolving said fault;
    ascertaining where said data exchange was paused;
    ascertaining whether further data is needed to complete a particular processing task of said means for handling said error message;
    specifying said further data;
    requesting transfer of said further data corresponding to said specifying; and
    monitoring a further data transfer for a subsequent error, wherein said monitoring is performed upon resumption of said data exchange between said client and said server.

11. The system as recited in claim 7 wherein said means for handling said error message further comprises an application error handler.

12. The system as recited in claim 7 wherein said means for detecting said error and for generating an error message corresponding to said error comprises a protocol process.

13. The system as recited in claim 12 wherein said means for detecting said error and for generating an error message corresponding to said error further comprises a protocol extension.

14. The system as recited in claim 7 wherein said message is generated within an error message stack.

15. In a computer system of a client-server network, a computer usable medium having a computer readable program code embodied therein for causing said computer system to perform a method for notification of an error in data exchanged for an application between a telnet of said client and a telnet of said server, said method comprising:
    detecting said error;
    generating an error message corresponding to said error wherein said message is separate from said data; and handling said error message wherein said message has priority over said data and wherein said handling is performed with said error message in the same queue as said data, wherein said error message is moved to a front of said queue when said error message is received such that each message in said queue does not have to be reviewed for error messages and each message in said queue, including messages received prior to said received error message, are not discarded before said error message is accessed.

16. The computer usable medium as recited in claim 15 wherein said method further comprises taking an action appropriate to said message.

17. The computer usable medium as recited in claim 16 wherein said action is ameliorative of said error.

18. The computer usable medium as recited in claim 17 wherein said action is selected from the list consisting essentially of:

notifying a user;

causing a pause in further data transfers between said client computer and said server while said error is resolved;

ascertaining a fault underlying said error;

resolving said fault;

ascertaining where said data exchange was paused;

ascertaining whether further data is needed to complete a particular processing task of said application;

specifying said further data;

requesting transfer of said further data corresponding to said specifying; and monitoring a further data transfer for a subsequent error, wherein said monitoring is performed upon resumption of said data exchange between said client and said server.

* * * * *

UNITED STATES PATENT AND TRADEMARK OFFICE
CERTIFICATE OF CORRECTION

PATENT NO. : 8,332,694 B2  
APPLICATION NO. : 10/254556  
DATED : December 11, 2012  
INVENTOR(S) : Rajeev Grover et al.

Page 1 of 1

It is certified that error appears in the above-identified patent and that said Letters Patent is hereby corrected as shown below:

In the Specification

In column 4, line 17, delete "as" and insert -- a --, therefor.

In column 4, line 33, delete "800" and insert -- 800, --, therefor.

In column 4, line 36, after "side." insert -- Client application 203 requires the data from queue 403. --.

In column 4, line 36, after "appears" delete "in" and insert -- within --, therefor.

In column 5, line 42, after "same" insert -- message --.

In column 6, line 31, after "priority" delete "of".

Signed and Sealed this  
Third Day of December, 2013

Margaret A. Focarino  
*Commissioner for Patents of the United States Patent and Trademark Office*